United States Patent
Breau

(10) Patent No.: US 8,036,172 B1
(45) Date of Patent: Oct. 11, 2011

(54) STATEFUL HOME AGENT RECOVERY PROTOCOL (SHARP)

(75) Inventor: Jeremy Richard Breau, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 921 days.

(21) Appl. No.: 11/457,964

(22) Filed: Jul. 17, 2006

(51) Int. Cl.
*H04W 4/00* (2009.01)
(52) U.S. Cl. .................. 370/331; 455/433; 370/216
(58) Field of Classification Search ....... 455/432.1–433; 370/331, 216
See application file for complete search history.

(56) References Cited

U.S. PATENT DOCUMENTS

| | | | |
|---|---|---|---|
| 6,195,705 B1* | 2/2001 | Leung | 709/245 |
| 6,560,217 B1 | 5/2003 | Peirce, Jr. et al. | |
| 2002/0012327 A1* | 1/2002 | Okada | 370/328 |
| 2002/0080752 A1* | 6/2002 | Johansson et al. | 370/338 |
| 2003/0128689 A1 | 7/2003 | Peirce, Jr. et al. | |
| 2003/0182433 A1* | 9/2003 | Kulkarni et al. | 709/228 |
| 2003/0208618 A1* | 11/2003 | Mor et al. | 709/238 |
| 2004/0174876 A1 | 9/2004 | Peirce, Jr. et al. | |
| 2004/0202126 A1* | 10/2004 | Leung et al. | 370/331 |
| 2005/0249113 A1* | 11/2005 | Kobayashi et al. | 370/219 |
| 2005/0257002 A1* | 11/2005 | Nguyen | 711/114 |
| 2006/0155828 A1* | 7/2006 | Ikeda et al. | 709/220 |
| 2007/0104146 A1* | 5/2007 | Hossain et al. | 370/331 |
| 2007/0233746 A1* | 10/2007 | Garbow et al. | 707/200 |

OTHER PUBLICATIONS

Jahanzeb Faizan et al, "VHARP: Virtual Home Agent Reliability Protocol for Mobile IPv6 Based Networks," 2005 International Conference on Wireless Networks, Communications and Mobile Computing, vol. 2, pp. 1295-1300 (Jun. 2005).
"Cisco Home Agent Redundancy and Load Balancing," White Paper [online], [retrieved on Oct. 17, 2006]. Retrieved from the Internet <http://www.cisco.com/en/US/products/ps5940/products_white_paper0900aecd802921f0.shtml>.
"Cisco—Hot Standby Router Protocol Features and Functionality" Document ID: 9234. [online], Retrieved from the Internet <http://www.cisco.com/warp/public/619/hsrpguidetoc.html> [Updated: Jan. 24, 2006].
R. Hinden, "Virtual Router Redundancy Protocol (VRRP)," The Internet Engineering Task Force, Network Working Group, Request for Comments: 3768, Apr. 2004, [online], Retrieved from the Internet <http://www.ietf.org/rfc/rfc3768.txt>.

* cited by examiner

*Primary Examiner* — Lester Kincaid
*Assistant Examiner* — Steven Lim

(57) ABSTRACT

A method and system for resilient mobile communications in a network when network elements are removed, upgraded or fail are provided. A mobile device communicates with an endpoint through foreign and home agents communicatively connected to the network. An active home agent stores communication information for the mobile node and multicasts the communication information to non-active home agents associated with the active home agent. When an active home agent is removed, upgraded or fails, the mobile device is able to maintain mobile communications with the endpoint through one or more non-active home agent. A non-active home agent having a high priority is transitioned to active status to maintain communication service between the mobile node and endpoint.

10 Claims, 7 Drawing Sheets

STATEFUL HOME AGENT RECOVERY PROTOCOL (SHARP)

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Conventionally, mobile Internet Protocol (IP) communications utilize a home agent and foreign agent, such as a packet data serving node, to provide mobile service to mobile devices. The home agent is a router on the mobile device's home network that delivers information from or to the mobile device. The foreign agent is a router or server located on a network visited by the mobile node when away from home. The foreign agent provides mobile services for the mobile device while the mobile device is visiting the network associated with the foreign agent. The foreign agent generates a path to the home agent and provides the mobile device with mobile service.

A home network that utilizes a single home agent creates a single point of failure. When the home agent is taken offline, the mobile service to the mobile device is interrupted until a new home agent is connected to the home network. Some networks are configured with multiple home agents to eliminate the single point of failure. For instance, a network may utilize one-to-one redundancy mechanisms that provide a backup home agent for each active home agent. The backup and active home agent share the same configuration and are synchronized periodically. Accordingly, when the active home agent fails, the backup home agent is added to the network.

Although the one-to-one redundancy mechanism provides fault-tolerance by eliminating the single point of failure, the synchronization process may prevent the backup home agent from quickly replacing the active home agent and may delay service to the mobile device. Also, the mechanism is limited to IP version four (IPv4) and may not effectively work with IP version six (IPv6) communication networks.

SUMMARY

The present invention is defined by the claims below. Embodiments of the present invention provide a system and method for, among other things, providing consistent mobile communication in the event of failure, maintenance or upgrade of a home agent associated with a mobile device. The present invention has several practical applications in the technical arts including home agent redundancy in communication networks configured with IP version four or six and automatic selection of home agents with outstanding communication metrics to route mobile communications from a group of home agents.

In a first aspect, a mobile device and foreign agent provide binding information to a switch that routes mobile communication associated with the mobile device to an appropriate destination. The switch receives an update notification having a virtual media access control address and foreign agent address from the mobile device. The update notification is processed to extract the virtual media access control address. A forwarding table stored by the switch is searched to determine a communication port associated with the virtual media access control address. The communication port is selected, and the update notification is transmitted to the active home agent associated with the communication port.

In a second aspect, a non-active home agent takes over mobile communication when the active home agent fails. The non-active home agent receives messages specifying an address for a foreign agent associated with a mobile device. The foreign agent address is stored in non-active binding tables associated with the non-active home agent. The non-active home agent listens for periodic hello messages from an active home agent. When the active home agent fails to send the hello message within a specified failure threshold, the non-active home agent is promoted and advertisement messages are transmitted by the non-active home agent.

In a third aspect, an active home agent included in a home agent group may be preempted by a non-active home agent included in the home agent group. When a new home agent configured with the appropriate attributes is added to the home agent group and the new home agent has a higher priority than the active home agent, the active home agent is checked to determine if preemption is allowed. If the active home agent allows preemption, the new home agent is provided with binding information and the active home agent changes from active status to non-active status.

In a fourth aspect, a communication system provides a communication network, a switch, and active and non-active home agents. The switch routes mobile communications associated with a mobile device on the communication network. Also, the switch includes, among other things, a multicast table and active and backup ports that connect the active and non-active home agents to the communication network. The non-active home agents are configured to seamlessly replace the active home agents when specified conditions are satisfied.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
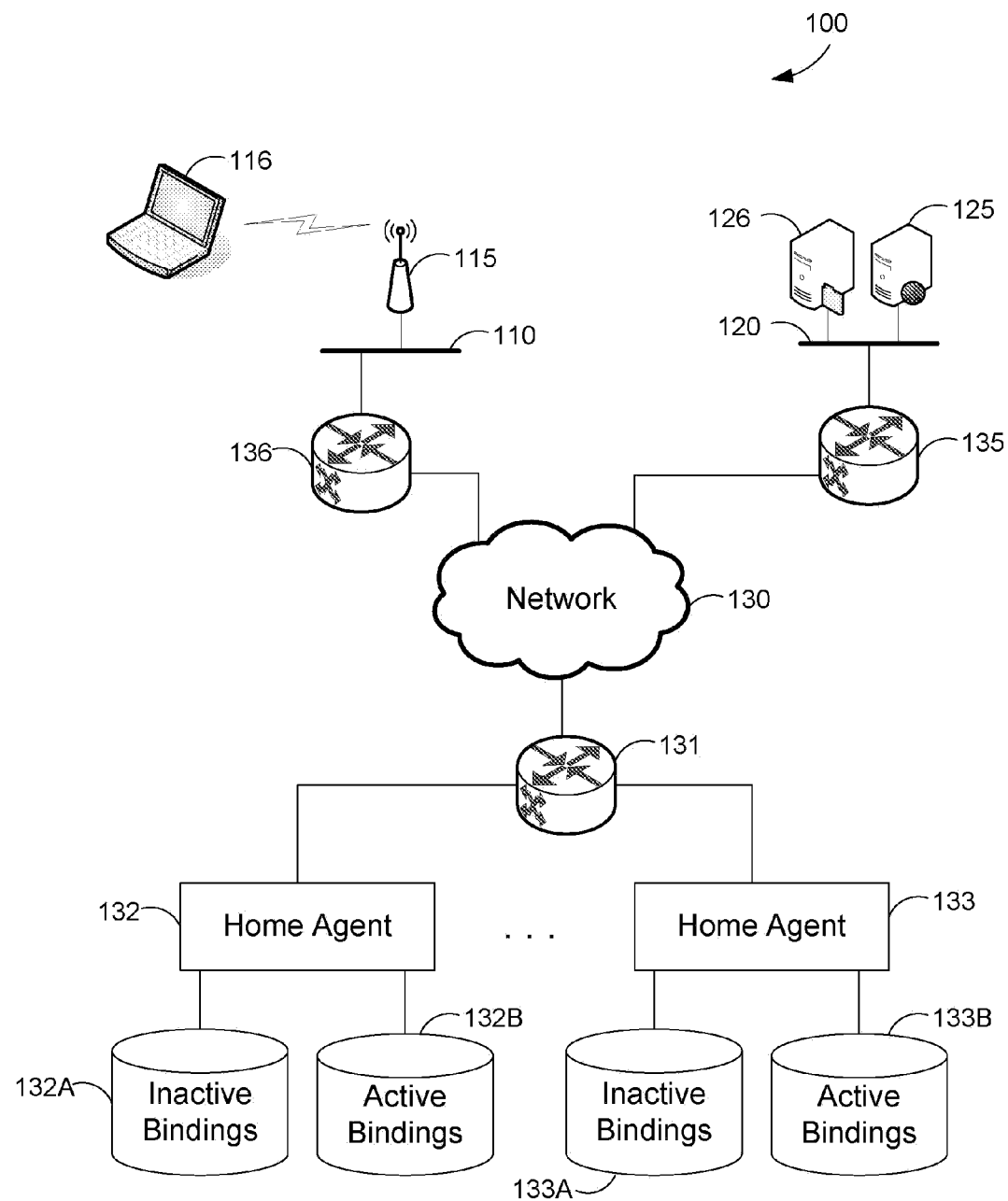
FIG. 1 is a network diagram that illustrates an exemplary operating environment, according to embodiments of the present invention.

Embodiments of the present invention provide systems and methods for seamless recovery from a home agent failure in a communication network. When an active home agent fails, a non-active home agent statefully replaces the active home agent and routes communications that the active home agent was processing. In some embodiments, Stateful Home Agent Recovery Protocol (SHARP) enables transparent removal of hardware elements, such as routers or bridges, without modifying the underlying protocol, such as IP version six. Additionally, the hardware elements may be removed from service due to failure, operator maintenance or upgrade, without degrading service to network subscribers, such as mobile devices. In another embodiment, information provided at a data link layer of the home agent or switch is utilized to process binding data and notify home agents of failure. Because the binding data and notifications are processed at layer one of a protocol stack, the communications are processed efficiently without incurring delays associated with processing at layer three of the protocol stack. Accordingly, when hardware elements associated with an active home agent are removed due to failure, maintenance, upgrade, or any other reason, the non-active home agent efficiently replaces the active home agent.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

CDMA Code Division Multiple Access
FA Foreign Agent
FAA Foreign Agent Address
HA Home Agent
ICMP Internet Control Message Protocol
IP Internet Protocol
MAC Media Access Control
MDLP Mobile Data Link Protocol
PDSN Packet Data Serving Node
SHARP Stateful Home Agent Recovery Protocol As utilized herein, a component refers to any combination of hardware and software. Furthermore, computer-readable media may include both volatile and nonvolatile media, removable and non-removable media, and contemplates media readable by a database, a switch, and various other network devices. Network switches, routers, and related components are conventional in nature, as are means of communicating with the same. By way of example, and not limitation, computer-readable media may comprise computer-storage media and communication media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

In an embodiment, a communication network may utilize Stateful Home Agent Recovery Protocol (SHARP) to maintain mobile device binding tables across two or more home agents. The communication network provides access to endpoints remote from the mobile device and enables mobile communication with the endpoints. FIG. 1 is a network diagram illustrating an exemplary operating environment 100, according to embodiments of the invention. One of ordinary skill in the art appreciates that operating environment 100 has been simplified to illustrate key features of embodiments of the present invention.

In FIG. 1, the operating environment 100 includes a first network 110, a second network 120, and third network 130. The networks 110 and 120 are connected via backbone switches 136 and 135. In an embodiment, network 110 is a wireless network that includes backbone switch 136, a foreign agent 115, such as a wireless base station, and a mobile device 116. Network 120 includes a backbone switch 135 and endpoints 125 and 126. The endpoints 125 and 126 may include servers or other mobile devices. The network 130 may be the Internet or a virtual private network. The network 130 includes a backbone switch 131 that routes communications between networks 110 and 120. The backbone switch 131 includes home agents 132 and 133 that route mobile communications to or from mobile device 116.

In an embodiment of the present invention, the mobile device 116 may be a wireless phone, a laptop computer, or a personal digital assistant. The mobile device may move to many different networks. When a network is equipped with a foreign agent 115, the mobile device 116 is provided with mobile communication services. The foreign agent 115 is configured to accept and route mobile communication requests destined for endpoints 125 or 126.

The foreign agent 115 may be a wireless base station, a packet data serving node that routes mobile communications to an appropriate home agent 132 or 133 associated with the mobile device 116 or functionally integrated within the mobile device 116 itself. The foreign agent 115 receives requests from the mobile device 116 and processes the requests to update the home agents 132 and 133. In certain embodiments, the mobile device 116 and foreign agent 115 may utilize code division multiple access (CDMA) to facilitate wireless communication on network 110.

The endpoints 125 and 126 may include servers or other mobile devices. The servers may include file servers or web servers. In response to a request received from the mobile device 116, the endpoints 125 and 126 transmit data, such as voice, video or text, to the mobile device 116. In certain embodiments, the endpoints 125 and 126, backbone switches 131, 135 and 136, foreign agent 115 or mobile device 116 may utilize IP version six to address communication interfaces.

The backbone switches 131, 135 and 136 route data from the mobile device 116 to the endpoints 125 and 126. In an embodiment of the invention, backbone switch 131 is provisioned with home agents 132 and 133 that provide mobile services to the mobile device 116. The home agents 132 and 133 are configured with inactive binding databases 132A, 133A and active binding databases 132B, 133B. The mobile device 116 provides binding information to the home agents 132 and 133 when the device moves to a network that provides network access through a foreign agent 115. The binding information includes information about the foreign agent 115. So, the home agents 132 and 133 store the binding information in active and inactive binding databases 132A, 132B 133A and 133B and utilizes the binding information to route communications to the mobile device 116.

In an embodiment, one or more home agents 132 or 133 are configured in an active state and other home agents 132 or 133 are configured in a non-active state. In the active state, the binding information is stored in an active binding database 132B or 133B. In the non-active state, the binding information is stored in non-active binding database 132A or 133A. For instance, when home agent 132 is configured as active and home agent 133 is configured as non-active, the active home agent 132 receives and stores binding updates generated by the mobile device 116. Additionally, the active home agent 132 utilize a mobile data link protocol (MDLP) to inform the non-active home agent 133 of the binding updates. The non-active home agent 133 receives and stores the binding updates. In some embodiments, the active and non-active home agents 132 and 133 exchange binding information via multicast messages.

The foregoing network configuration is illustrative. Furthermore, the skilled artisan understands that embodiments of the present invention may be implemented in many other network configurations.

In an embodiment, a switching element provides a communication interface between multiple home agents (HA) that broadcast messages to each other through multicast messages. The home agents utilize a Stateful Home Agent Recovery Protocol (SHARP) to negotiate a media access control (MAC) address and a SHARP IP address to form a SHARP group for the switching element. The SHARP group shares a common configuration and includes at least one active HA and at least one non-active HA. The SHARP group utilizes broadcast messages to exchange data such as binding information. When a packet arrives at the switching element, the destination address is parsed to locate the MAC address, and a forwarding table is traversed to determine which HA from the SHARP group is associated with the MAC address. In certain embodiments, the active HA is addressed by the SHARP MAC address negotiated by the SHARP group.

Figure 2:
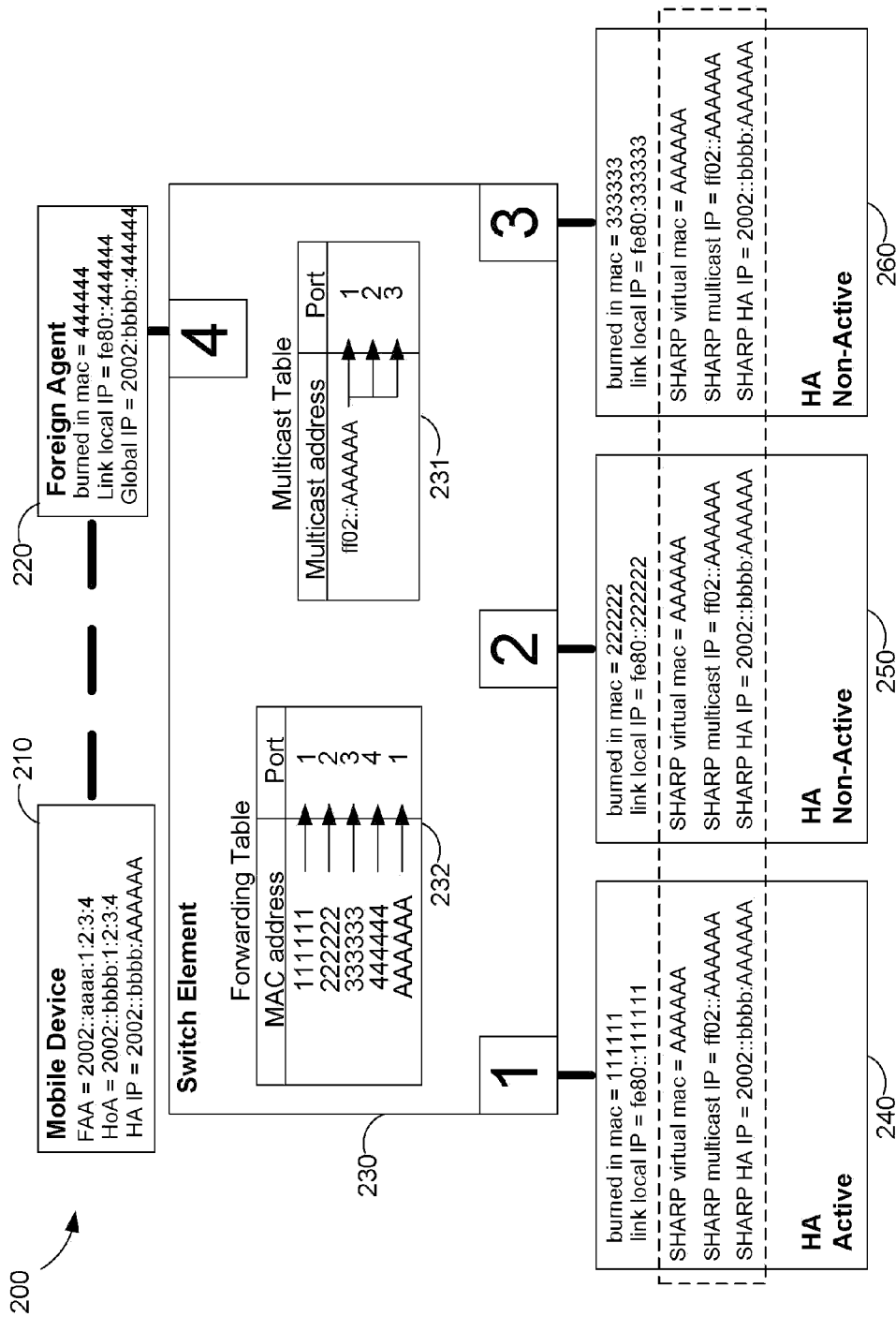
FIG. 2 is a network diagram that illustrates an exemplary switching element, according to embodiments of the present invention.

FIG. 2 is a network diagram that illustrates an exemplary switching element 230, according to embodiments of the present invention;

In FIG. 2, mobile device 210 communicates with foreign agent 220 to access active home agent 240 through switching element 230. The mobile device 210 is configured with a SHARP IP address. In certain embodiments, the SHARP IP address is a IP version six address that includes a MAC component. The mobile device 210 utilizes this SHARP IP address to communicate with the active home agent 240 when routing information to an endpoint. The mobile device 210 may also include a foreign agent address (FAA) that indicates the location of the foreign agent 220 that facilitates access to the switching element 230.

The foreign agent 220 provides network access to mobile device 210 and is connected to switching element 230. The foreign agent 220 routes communications from the mobile device to the active home agent 240 through switching element 230.

The switching element 230 includes communication ports that connect foreign agent 230, active home agent 240 and non-active home agents 250 and 260. The communication ports include active ports for the active home agent 240 and backup ports for the non-active home agents 250 and 260. Also, the switching element 230 includes a forwarding table 232 and multicast table 231.

The forwarding table 232 includes a MAC address for each interface connected to the switching element 230 and the corresponding port associated with each MAC address. The forwarding table 232 contains two entries for the active home agent 240. The first entry associates a burned-in MAC address with the active port, and the second entry associates the SHARP MAC address with the active port. For instance, turning to FIG. 2 the burned in MAC address of the active home agent is "11111" and the SHARP MAC is "AAAAA." Thus, the active home agent 240 may be addressed by the SHARP MAC address and the burned-in MAC address. In an embodiment, when the active home agent 232 fails, one of the non-active home agent 250 or 260 replaces the active home agent 240, and the forwarding table 232 is updated to associate the SHARP MAC address with the backup port of the non-active home agent 250 or 260 that replaced the active home agent 240.

The active home agent 240 and non-active home agents 250 and 260 are configured with a SHARP MAC address, SHARP multicast address and SHARP IP address to form a SHARP group. The SHARP group includes at least one active home agent 240 and one or more non-active home agents 250 and 260. The SHARP MAC address is a virtual MAC address that is utilized to refer to members of the SHARP group. Moreover, the SHARP MAC address is a component of the SHARP IP address, which is provided to the mobile device to allow communication with the home agent. In some embodiments, the SHARP IP address acts a global address for the SHARP group. Furthermore, the SHARP IP address allows the mobile device to connect to at least one member of the SHARP group when an active home agent fails. The SHARP multicast address allows the active and non-active home agents to broadcast data to each other. For instance, binding information and notifications may be broadcast by utilizing the SHARP multicast address.

The switching element 230 includes a multicast table 231 that specifies the ports associated with the SHARP group. The multicast table 231 provides address information to enable the switching element 230 to transmit binding information and advertisement messages to all members of the multicast group. In an embodiment, the multicast table 231 includes a SHARP multicast address and specifies the ports associated with home agents are configured to receive a message having the multicast address. In some embodiments, the binding information is transmitted via multicast addresses. Additionally, notification of active home agent failure and non-active home agent take-over is communicated by multicast messages.

Accordingly, the switching element 230 enables the mobile device 220 to communicate with the active home agent 240. Also, the switching element 230 utilizes SHARP groups to enable home agent recovery and synchronization via multicast messages that specify the SHARP MAC address. Thus, the switching element is optimized to perform layer one processing and communications when the non-active home agent replaces the active home agent. In an embodiment, the switching element and active and non-active home agents are a single hardware component. In other embodiments, the switching element and active and non-active home agents are distributed and separate hardware components.

Figure 3:
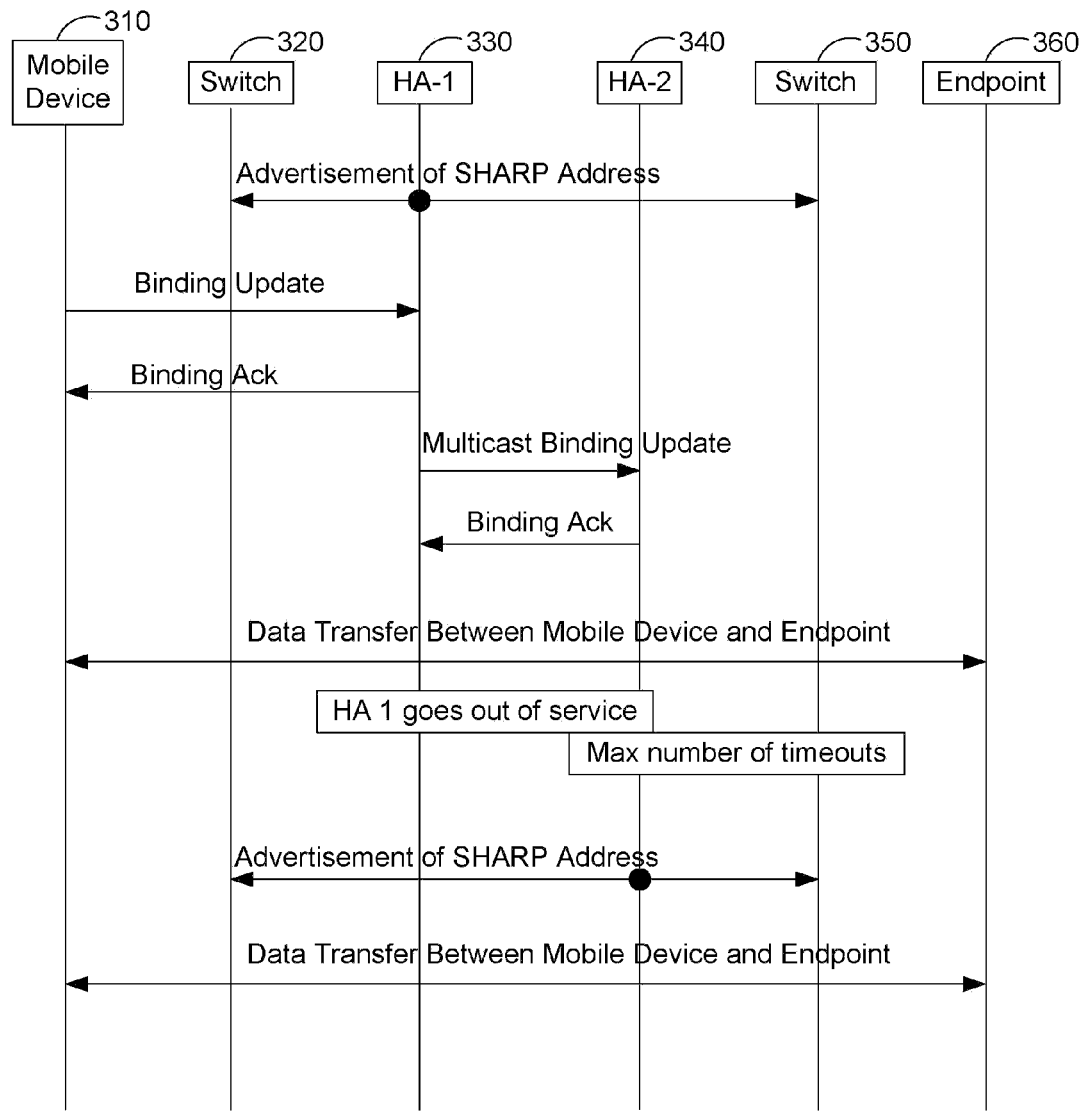
FIG. 3 is a message diagram that illustrates exemplary message exchanges, according to embodiments of the present invention.

In an embodiment of the present invention, when a mobile device sends a communication, the active home agent updates an active binding table to include the FAA associated with the mobile device. After the active home agent updates its active binding tables, the active home agent generates a multicast message. Non-active home agents that receive the multicast message update their inactive tables to backup the active binding table of the active home agent. The message exchanges between the mobile device and active and non-active home agents ensure seamless recovery when the active home agent fails. FIG. 3 is a message diagram that illustrates exemplary message exchanges, according to embodiments of the present invention.

In FIG. 3, the mobile device 310, switches 320 and 350, HA-1 330, HA-2 340 and endpoint 360 exchange messages to ensure the data transfer between mobile device 310 and 360 is not interrupted when the HA-1 330 goes out of service. HA-1 330 and HA-2 340 form a SHARP group and HA-1 330 generates an advertisement message to inform the switches 320 and 350 of the SHARP address for the SHARP group. HA-1 330 is the active home agent because HA-1 330 has a higher priority than HA-2 340. The mobile device 310 is configured with the SHARP address and generates a binding update when a foreign agent enables the mobile device to access HA-1 330. In response to the binding update, HA-1 330 generates an acknowledgement and stores an address of the foreign agent in the active binding tables of HA-1 330. In turn, HA-1 330 generate a multicast message that includes the binding update. HA-2 340 receives and stores the binding update in inactive binding tables and transmits an acknowledgement to HA-1 330. The mobile device 310 initiates a data transfer with endpoint 360 that is routed via the switches 320 and 350 and active home agent HA-1 330. When HA-1 330 is taken out of service during the data transfer and a failure thresholds is satisfied, the non-active home agent HA-2 340 takes over the data transfer by generating an advertisement to the switches 320 and 350. Once the switches are informed that HA-2 is routing information for HA-1 330, the mobile device continues its data transfer with endpoint 360 without losing mobile service. The data transfer is now routed via the switches 320 and 350 and active home agent HA-2 340. Accordingly, a mobile device and endpoint may continue communications in event of active home agent failure, when the active home agent is part of a SHARP group that includes one or more non-active home agents.

The message exchange between the mobile node, foreign agent and home agent utilizes packets that include binding information and address information. The packets are addressed to the appropriate destination and provide the information needed to ensure that active and inactive binding tables are up to date. FIG. 4 illustrates an exemplary packet and data structure that stores the address and binding information.

Figure 4A:
FIG. 4A is a packet diagram that illustrates exemplary fields of a packet, according to embodiments of the present invention.

FIG. 4A is a packet diagram that illustrates exemplary parts of a packet 410, according to embodiments of the present invention. In FIG. 4A, the packet 410 includes a foreign agent address 411 and a sharp address 411. The packet 410 may be generated by a mobile device when the mobile device connects to a network that includes a foreign agent that provides access to an active home agent. The mobile device may be configured with a SHARP address that specifies the SHARP group and the active home agent of the SHARP group.

Figure 4B:
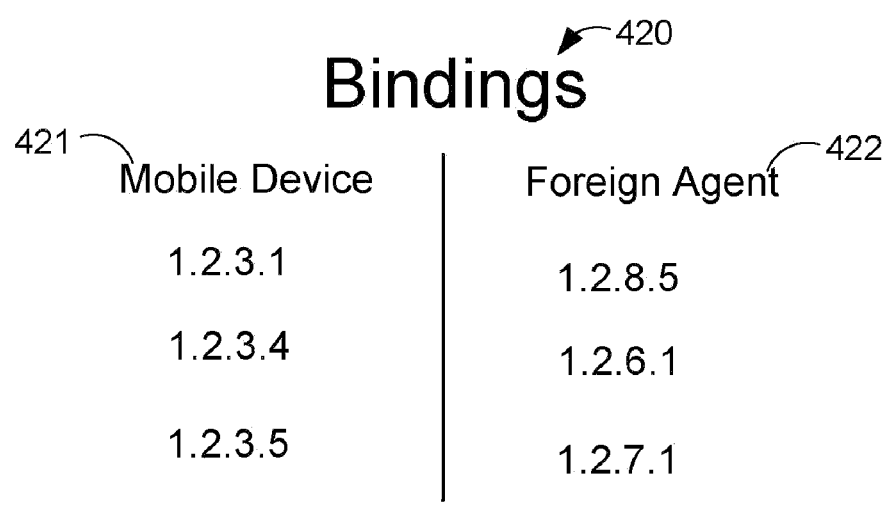
FIG. 4B is a data structure that illustrates an exemplary binding table, according to embodiments of the present invention.

FIG. 4B is a data structure that illustrates an exemplary binding table 420, according to embodiments of the present invention. In FIG. 4B, the binding table 410 includes a mobile device field 421 and foreign agent field 422. The mobile device field 421 specifies the address for the mobile device and the foreign agent field 422 specifies the address for the corresponding foreign agent that provides access to the active home agent. The binding table 420 may be stored in the active and inactive tables associated with active and non-active home agents.

The binding and address information enables SHARP groups having active and non-active home agents to quickly recover from active home agent failure and allows mobile communications between a mobile device and endpoint to continue without interruption.

The home agents in a SHARP group are configured with a group identifier, priority, hello time, failure threshold, SHARP multicast address, SHARP IP address and SHARP MAC address. The group identifier identifies the SHARP group when a home agent belongs to multiple groups. The priority quantifies the ability of the home agent to effectively route mobile communications. A high priority indicates that the home agent is qualified to route the communications. In an embodiment, the priority may be determine based on the hardware costs, processing speed, link speed, bandwidth, or traffic congestion associated with the home agent. Moreover, in a certain embodiments, communication metrics such as traffic congestion, or communications delays may be utilized to select the active home agent. The hello time specifies a period at which the active home agent generates an indication to each non-active home agent in the SHARP group. In an embodiment, the indication includes an Internet control message protocol (ICMP) message. The failure threshold indicates the point at which the non-active home agent concludes that the active home agent is not in service because a hello message was not received within the specified failure threshold. As indicated above, the SHARP IP address, SHARP multicast address, and SHARP MAC address are configured to enable the non-active home agents to replace the active home agent without interrupting the transfer between the mobile device and endpoint.

Figure 5:
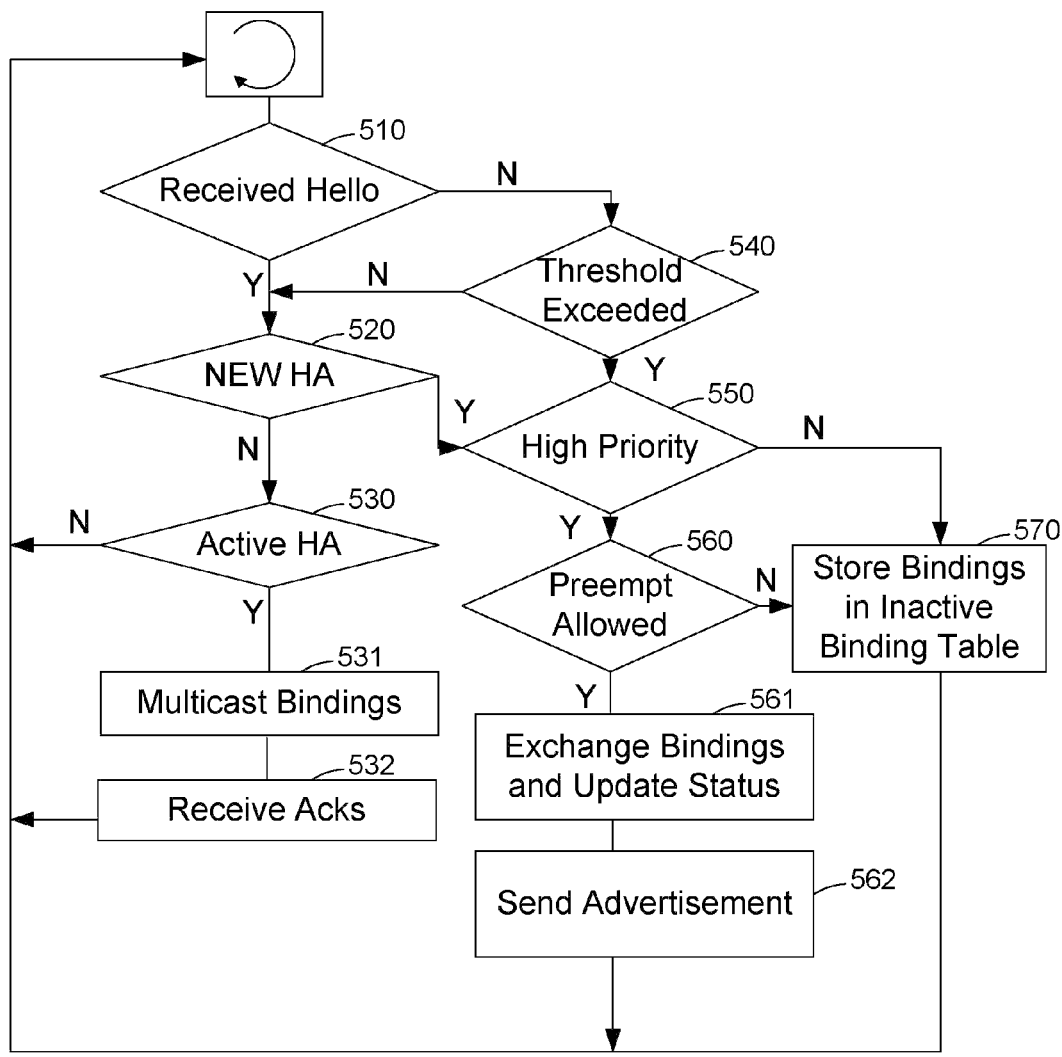
FIG. 5 is a logic diagram that illustrates an exemplary method for updating binding information, according to embodiments of the present invention.

FIG. 5 is a logic diagram that illustrates an exemplary method for updating binding information, according to embodiments of the present invention. In step 510, a check is made to determine whether a hello was received from the active home agent in the SHARP group. If the hello is not received, in step 540, a check is made to determine whether the specified threshold for the SHARP group is exceeded. If the hello is received or the specified threshold is not exceeded, in step 520, a check is made to determine whether the home agent is a new home agent. When the home agent is not new, in step 530, a check is made to determine if the home agent is in active or non-active status. When the home agent has active status, the binding information is multicast to non-active home agents in step 531 and the active home agents receives acknowledgements from the non-active home agents in step 532. Thereafter, the method repeats.

When the home agent is new or the failure threshold is exceeded, in step 550, a check is made to determine which home agent has the highest priority. If the new home agent does not have the highest priority and the active home agent did not fail, in step 570, the bindings in the active binding table of the active home agent are stored in the inactive binding table of the new home agent and the method repeats. If the new home agent does have the highest priority and the active home agent is operating, in step 560, a check is made to determine if the active home agent allows preemption. If preemption is allowed, the bindings from the active home agent is stored in the active binding table of the new home agent and the active home agent transitions to inactive status in step 561. Also, the new home agent generates an advertisement message to indicate that the new home agent is the active home agent in step 562 and the method repeats. If preemption is not allowed, in step 570, the active binding table of the active home agent is copied to the inactive binding table of the new home agent and the status of the new home agent is set to non-active. Thereafter, the method repeats.

If the threshold is exceeded and the non-active home agent with the highest priority is selected, then in step 560 preempt is allowed because there is no active home agent currently operating. In turn, the appropriate binding information is exchanged by copying information from the inactive table to the active table of the non-active home agent, and the status of the non-active home agent is changed to active in step 561. Moreover, in step 562, an advertisement message is generated to inform all other non-active home agents of the replacement. Thereafter, the method repeats.

Accordingly, when the appropriate conditions are satisfied, the SHARP group allows non-active home agents to replace active home agents without interrupting the transfers between the mobile device and endpoint.

In certain embodiments, the communication between the mobile node and the endpoint is facilitated through a SHARP group having at least one active home agent. As the mobile device moves from network to network, the active home agent receives binding updates from the mobile device, where the binding updates include foreign agent address for each network that provides access to the active home agent. The endpoint communicates with the mobile node by sending data to the active home agent because the active home agent is always aware of the location of the mobile node. Accordingly, the active home agent operates as a mediator between the mobile node and the endpoint, and informs the non-active home agents in the SHARP group of the binding updates received from the mobile node.

Figure 6:
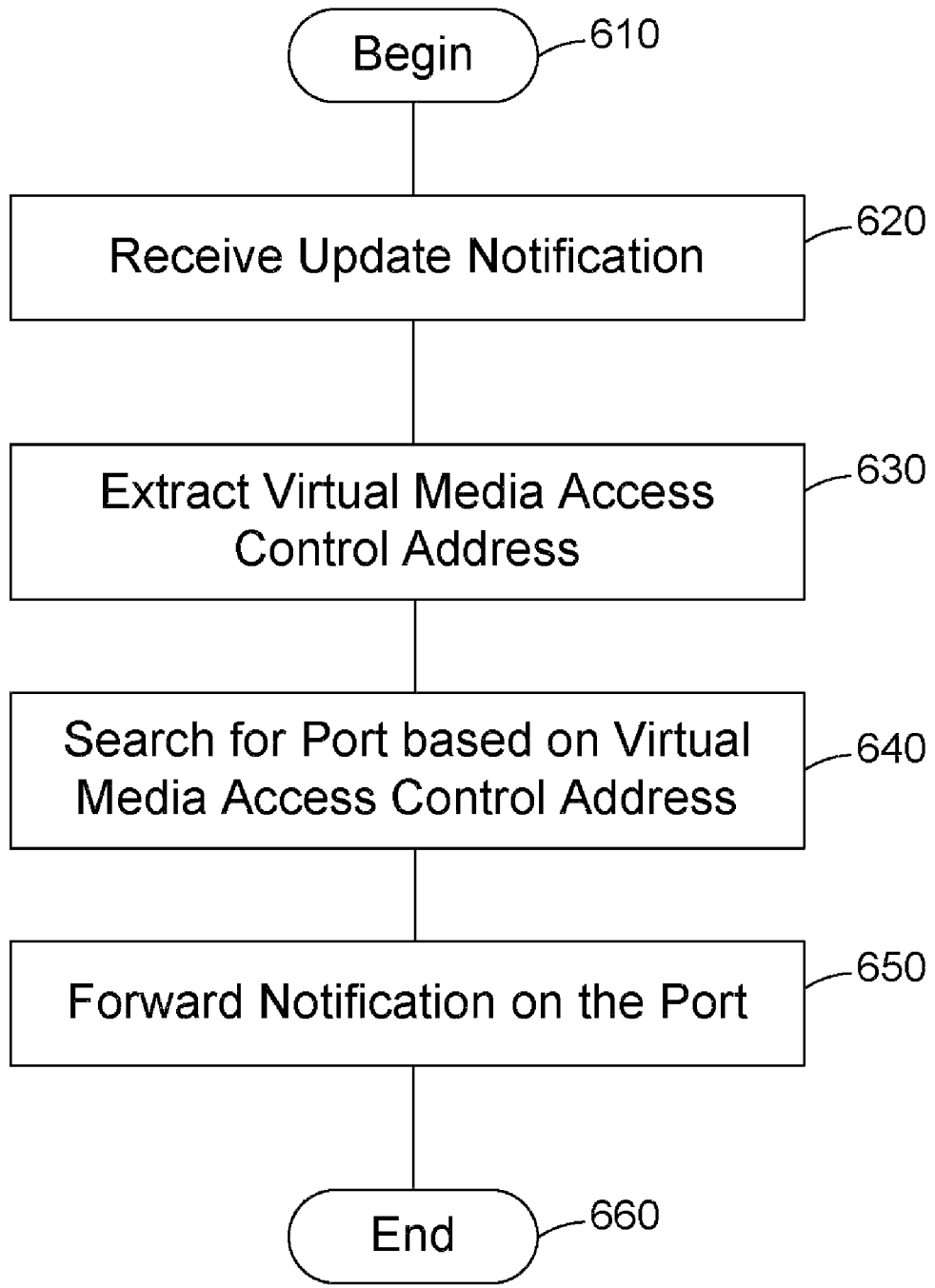
FIG. 6 is a logic diagram that illustrates an exemplary method for exchanging binding information, according to embodiments of the present invention.

FIG. 6 is a logic diagram that illustrates an exemplary method for exchanging binding information, according to embodiments of the present invention. The method begins in step 610 when the mobile node enters a new network having a foreign agent that provides access to the active home agent. In step 620, the switching element receives an update notification that includes the SHARP MAC address from the mobile device. In an embodiment, the update notification may include the SHARP IP address which is an IP version six address that has the SHARP MAC address as a component. In step 630, the SHARP MAC address is extracted from the notification. In step 640, the switching element searches for ports associated with the SHARP MAC address. In step 650, the update notification is forwarded to the port connected to the active home agent associated with SHARP MAC address. The method ends in step 660. Accordingly, the switching element may receive the update notification and route the notification based on the SHARP IP or MAC address included in the notification.

When the active home agent fails, the non-active home agent with the next highest priority takes over. The non-active home agent concludes that the active home agent failed when no hello messages are received from the active home agent within the specified failure threshold. In turn, the bindings are copied from the inactive table to the active binding table and the status is changed to active. The endpoint continues communication with the mobile device through the non-active home agent that replaced the active home agent. Also, the other non-active home agent in the SHARP group are informed of the take over through an advertisement generated by the non-active home agent that replaced the active home agent. In certain embodiments, the advertisement is a packet with the source media address set as the SHARP MAC address.

Figure 7:
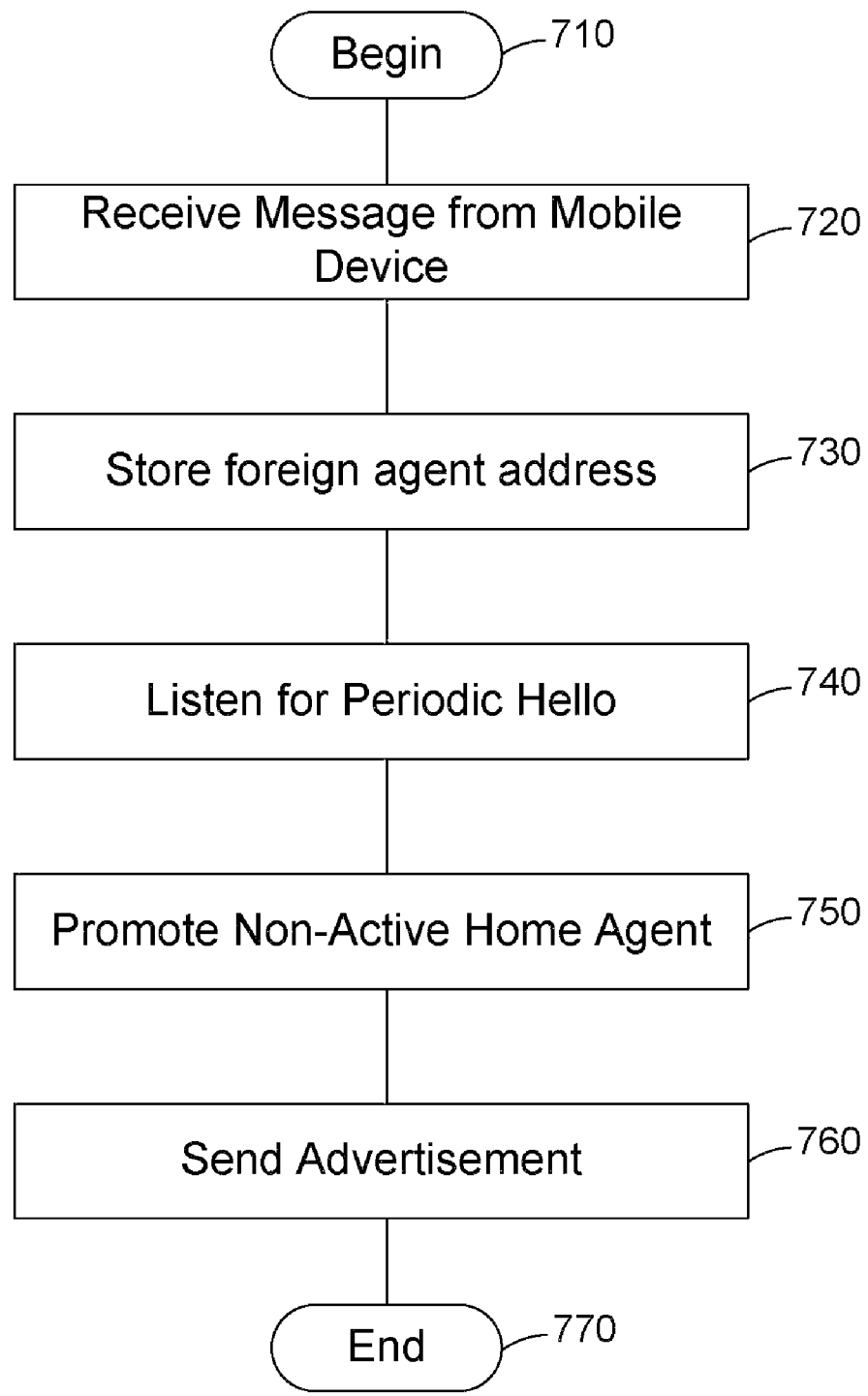
FIG. 7 is a logic diagram that illustrates an exemplary method for recovering from active home agent failure, according to embodiments of the present invention.

FIG. 7 is a logic diagram that illustrates an exemplary method for recovering from active home agent failure, according to embodiments of the present invention. The method begins in step 710. In step 620 a message is received from the mobile device. The message includes a foreign agent address that locates a foreign agent that provides access to the active home agent. The message may be broadcasted to the non-active home agents included in the SHARP group. In step 730, the foreign address is stored in the active table of the active home agent and in the non-active table of the non-active home agents. In step 740, the non-active home agents listen for hello messages from the active home agent. In step 750, if no hello messages are received within a specified failure threshold, the non-active home agent with the highest priority is promoted to active home agent. In step 760, the promoted non-active home agent generates an advertisement to inform the other non-active home agents of the replacement. The method ends in operation 770.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more tangible computer-readable media having computer-useable instructions embodied thereon for performing a method to exchange binding information, the method comprising:
    receiving an update notification having a virtual media access control address and a foreign agent address from a mobile device;
    extracting the virtual media access control address from the update notification;
    searching a forwarding table that stores relations between communication ports and media access control addresses;
    selecting a communication port associated with the virtual media access control address;
    forwarding the update notification to an active home agent associated with the communication port;
    storing the foreign agent address in an active binding table corresponding to the active home agent;
    generating a multicast message containing the foreign agent address, and transmitting the multicast message to non-active home agents; and
    receiving one or more acknowledgements to the multicast message from the non-active home agents.

2. The method of claim 1, wherein the virtual media access control address is part of an Internet Protocol version six address.

3. One or more tangible computer-readable media having computer-useable instructions embodied thereon for performing a method to recover from active home agent failure, the method comprising:
- receiving a message specifying an address for a foreign agent associated with a mobile device;
- storing the address of the foreign agent in non-active binding tables associated with non-active home agents;
- listening for periodic hello messages from an active home agent that routes communication for the mobile device;
- promoting a non-active home agent, when the active home agent fails to send the periodic hello message within a specified failure threshold, wherein promoting a non-active home agent comprises selecting a non-active home agent with a high priority, and copying entries from the inactive binding table of the selected non-active home agent to an active binding table of the selected non-active home agent; and
- sending an advertisement message from the promoted non-active home agent with the source media access control address set to a virtual media access control address.

4. The method of claim 3, wherein the priority is based on at least one of a hardware cost, speed, preferred route and hardware load.

5. The method of claim 3, wherein the advertisement message is a multicast message.

6. The method of claim 3, wherein the promoted non-active home agent replaces the active home agent by routing communications for the mobile device.

7. A communication system, the system comprising:
- a communication network;
- a switch communicatively connected to the communication network, the switch having an active port, one or more backup ports, a forwarding table and a multicast table;
- an active home agent communicatively connected to switch through the active port, wherein the active home agent processes communications received from the switch; and
- one or more non-active home agents configured to replace the active agent when a specified condition is met and communicatively connected to the switch through the one or more backup ports, wherein the multicast table defines a multicast group based on a virtual media access control address associated with the active and non-active home agents.

8. The system of claim 7, further comprising:
- a mobile device to generate mobile communications and binding updates.

9. The system of claim 8, further comprising:
- a foreign agent that provides the mobile device with access to the communication network.

10. The system of claim 7, where the communication network is a wireless network.

* * * * *